United States Patent [19]

Fujimura

[11] Patent Number: 5,169,693
[45] Date of Patent: Dec. 8, 1992

[54] LIQUID CRYSTAL DISPLAY ELEMENT

[75] Inventor: Koh Fujimura, Hino, Japan

[73] Assignee: Ricoh Company, Ltd., Tokyo, Japan

[21] Appl. No.: 666,720

[22] Filed: Mar. 8, 1991

[30] Foreign Application Priority Data

Mar. 29, 1990 [JP] Japan ................................. 2-78881

[51] Int. Cl.⁵ .................... G02F 1/1339; G02F 1/1341
[52] U.S. Cl. ........................................ 428/1; 428/122; 359/80
[58] Field of Search ..................... 428/1, 122; 359/80

[56] References Cited

U.S. PATENT DOCUMENTS 3,970,363  7/1976  Geyer et al. .................. 350/343
4,820,025  4/1989  Nakanowatari ............... 350/343

FOREIGN PATENT DOCUMENTS 57-169730 10/1982 Japan .
57-210324 12/1982 Japan .

Primary Examiner—Alexander S. Thomas
Attorney, Agent, or Firm—Oblon, Spivak, McClelland, Maier & Neustadt

[57] ABSTRACT

A liquid crystal display element which comprises a pair of substrates facing each other forming a cell gap therebetween and a sealing paste for bonding the pair of substrates and defining the cell between the substrates. The sealing paste is arranged to have an opening at a side edge of the cell for forming an injection port for injecting a liquid crystal in the cell. The port is sealed after the liquid crystal is injected in the cell. The display element further comprises a sealing member inserted onto the side edge of the cell at the position of the injection port. A clogging paste for covering and sealing the injection port is held within said sealing member.

11 Claims, 5 Drawing Sheets

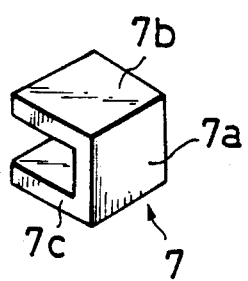
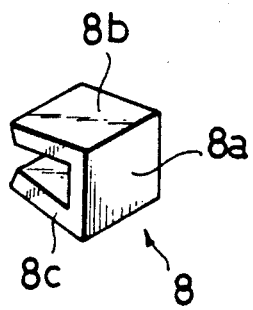
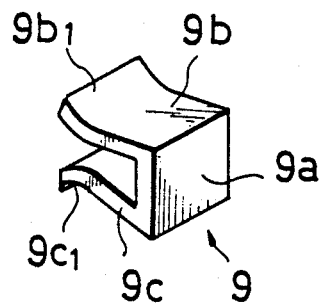
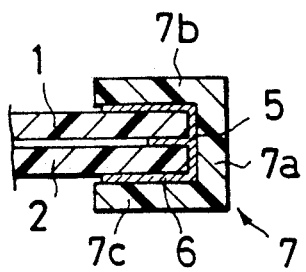
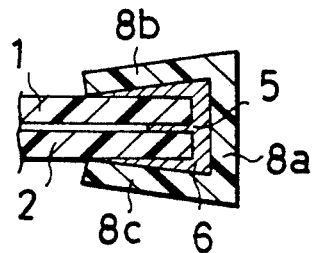
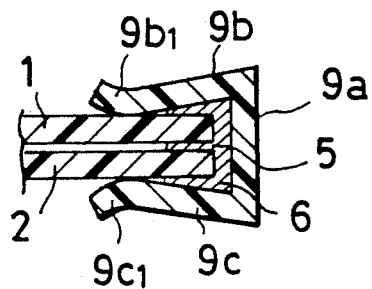

LIQUID CRYSTAL DISPLAY ELEMENT

BACKGROUND OF THE INVENTION

1. Field of the Invention

The present invention relates to a liquid crystal display element, more particularly, it relates to a liquid crystal display element which comprises a substrate made from a polymer film and has a liquid crystal injection port. The improvement of the present invention resides in that the injection port is reliably closed and sealed after the liquid crystal is injected in the element.

2. Description of the Related Art

These days, the liquid crystal display element is widely used in various fields including the field of personal computer wherein the element is used as the terminal display device for the computer. Therefore, the liquid crystal display element has to be usable on various different conditions wherein the element is used. Also, it is desirable that such a display element be realized at a low cost.

When producing such a display element, whether the liquid crystal injection port is sealed certainly or not is very influential not only to the functional reliability of the display element but also to the producing cost thereof.

The liquid crystal display element comprises a cell constituted by a pair of substrates facing each other forming a cell space therebetween and bonded together by an adhesive agent to seal the periphery of the substrates. The injection port is formed at a corner of one of the substrates. The liquid crystal is injected into the cell through the port. After that, the port is sealed by applying a sealing paste to the port.

However, the port is formed in the cell area defined by the sealing frame surrounding the cell, which means that the space unusable for displaying is formed in the cell area resulting in that the element becomes bulky.

SUMMARY OF THE INVENTION

It is therefore an object of the present invention to provide a liquid crystal display element in which the display area is effectively arranged and the injection port is rigidly and reliably sealed with a small amount of sealing paste by a simple process.

The above mentioned object of the present invention can be achieved by a liquid crystal display element comprising:
- a pair of substrates facing each other forming a cell gap therebetween;
- a sealing paste for bonding the pair of substrates and defining the cell between the substrates, the sealing paste having an opening at an side edge of the cell for forming an injection port for injecting a liquid crystal in the cell which port is to be sealed after the liquid crystal is injected;
- a sealing member inserted onto the side edge of the cell at the position of the injection port; and
- a clogging paste for covering and sealing the injection port, the clogging paste being held within the sealing member.

More precisely, in accordance with the present invention, the liquid crystal display element comprises a cell constituted from a pair of polymer film substrates facing each other forming a cell space therebetween and bonded together by a sealing paste, an injection port being formed at an end of the cell for injecting the liquid crystal into the cell, the port being sealed by a sealing paste after the liquid crystal is injected, wherein a sealing member carrying a sealing paste thereon is fixed to the cell end where the injection port is formed so as to seal the injection port. The sealing member has a substantially U-shaped section for holding the cell end.

Also, the sealing member of the present invention desirably comprises a stopper for limiting the fixing depth of the sealing member engaging with the cell end. The fixing depth may be limited by arranging a protruding portion on one of the substrates at the cell end where the injection port is formed so that the sealing member is stopped by the protruding portion.

Advantages of the structure in accordance with the present invention are that a predetermined amount of sealing paste is accurately applied to the injection port with the use of the sealing member, which makes it possible to reliably seal the port and avoid leakage of liquid crystal, and that it becomes easy to seal the injection port by applying the sealing paste to the port by using the sealing member carrying an appropriate amount of the sealing paste.

Further objects and advantages of the present invention will be apparent from the following discription of the preferred embodiments of the invention as illustrated in the accompanying drawings.

BRIEF DESCRIPTION OF THE DRAWINGS

FIG. 8 is a perspective view of an embodiment of the sealing member in accordance with the present invention;

FIG. 9 is a perspective view of another embodiment of the sealing member in accordance with the present invention;

FIG. 10 is a perspective view of still another embodiment of the sealing member in accordance with the present invention;

FIG. 11 is a sectional view of the sealing structure of the present invention in which the sealing member of FIG. 8 is applied to the injection port at the cell edge;

FIG. 12 is a sectional view of the sealing structure of the present invention in which the sealing member of FIG. 9 is applied to the injection port at the cell edge;

FIG. 13 is a sectional view of the sealing structure of the present invention in which the sealing member of FIG. 10 is applied to the injection port at the cell edge;

DESCRIPTION OF THE PREFERRED EMBODIMENTS

Figure 1:
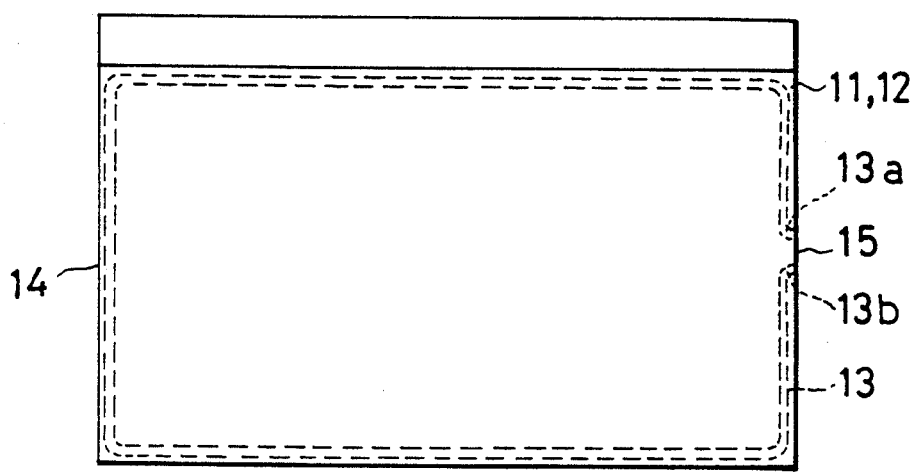
FIG. 1 is a plan view of a liquid crystal display element cell having a liquid crystal injection port at a side edge thereof to which the present invention can be applied.

Embodiments of the present invention are described hereinafter with reference to the drawings and in comparison to the related art structures which are also illustrated in the drawings.

FIG. 1 illustrates a plan view of a liquid crystal display element cell having an injection port at a side edge thereof.

The element comprises a cell 14 constituted from a pair of substrate 11 and 12 which are bonded together by a sealing paste 13 forming a cell space therebetween. The central portion of the right side of the sealing paste 13 is opened. The ends 13a and 13b of the sealing paste 13 at the opening portion are guided outward to the edges of the substrates 11, 12 so that an injection port 15 is formed at the cell edge.

Such an injection port 15 is sealed after a liquid crystal is injected in the cell.

Figure 2:
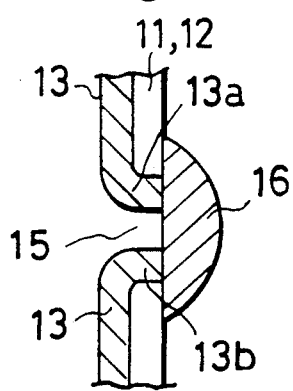
FIG. 2 is a partial sectional view of the injection port for explaining an example of the sealing structure in accordance with the related art.

FIG. 2 illustrates an example of the sealing structure of the injection port. The injection port 15 is sealed by a clogging paste 16. Each of the substrates 11 and 12 is made from a polymer film of about 100 μm thick. Therefore, the thickness of the cell 14 is only slightly more than about 200 μm at best. Accordingly, if the clogging paste 16 is applied only to the side edge surface of the cell, a sufficient amount of the paste can not be supplied since the space of the side edge surface is very narrow.

Figure 3:
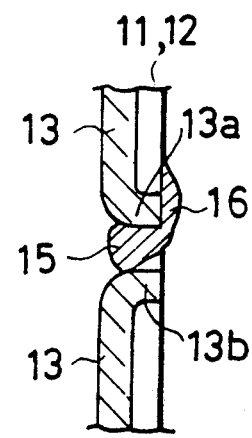
FIG. 3 is a partial sectional view of the injection port for explaining a disadvantage of the sealing structure in accordance with the related art.

FIG. 3 illustrates a state of sealing structure wherein the clogging paste is applied only to the side edge surface of the cell as mentioned above. Since the amount of the clogging paste 16 is not enougth to seal the port 15 and a part of the paste 16 intrudes into the port 15 due to the capillary attraction, the port 15 is not reliably sealed so that the liquid crystal may leak through the port.

Figure 4:
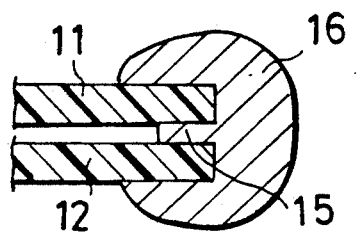
FIG. 4 is a partial sectional view of the cell edge for explaining another example of the sealing structure in accordance with the related art.
Figure 5:
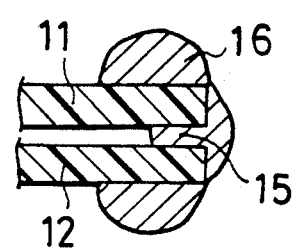
FIG. 5 is a partial sectional view of the cell edge for explaining a disadvantage of the related art structure.

FIG. 4 illustrates another state of the sealing structure wherein a large amount of the clogging paste 16 is applied to the injection port 15. In this case, however, the paste 16 is divided by the function of surface tension as illustrated in FIG. 5. Therefore, the amount of the paste 16 covering the side surface is reduced so that the same problem as the state of FIG. 3 arises.

As mentioned above, it is hard to reliably seal the injection port 15 formed in the side edge of the cell. Besides, when the paste is hardened in the state that the paste is attached not only to the side surface of the cell but also to the upper and lower surfaces of the cell, the treatment of the cell becomes inconvenient.

The embodiments of the present invention described below are improved from the above mentioned related art structure and obviate the problems of the related art mentioned above.

Figure 6:
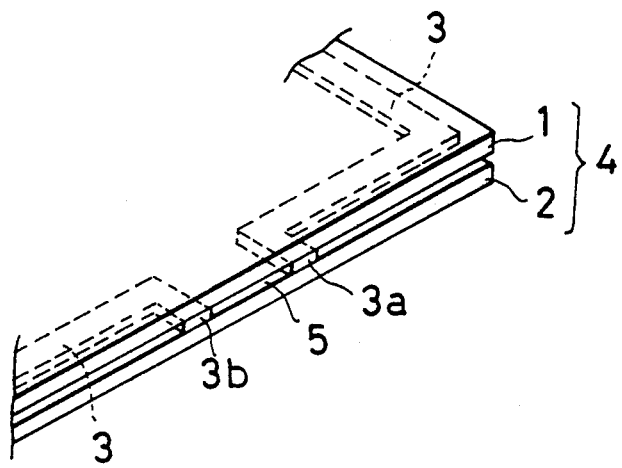
FIG. 6 is a partial perspective view of an embodiment of the liquid crystal injection port formed at an edge of the cell to which the sealing member in accordance with the present invention is applied.

FIG. 6 illustrates an example of the liquid crystal injection port formed in the side surface of the cell edge in accordance with the present invention.

In the structure of FIG. 6, the cell 4 is constituted from a first substrate 1 and a second substrate 2 each of which substrates is made from a uniaxially extensible polyethylene terephthalate film of 100 μm thick. ITO electrodes (not shown) are formed on each of the inside counter surfaces of the substrates 1 and 2. The ITO electrodes are covered by an orientation film which is treated by a rubbing operation.

The cell 4 is produced by such a way that, first, gapping particles such as plastic beads are dispersed on the inside surface of one of the substrates 1 and 2 and that a sealing paste 3 is applied on the periphery portion of the other substrate by, for example, a screen printing process and after that the two substrates are faced and bonded together by hardening the sealing paste 3.

An injection port 5 is formed at a side edge of the cell 4 for injecting liquid crystal in the cell 4. The injection port 5 is defined by two ends of the sealing paste 3a and 3b which extend outward to the edge of the cell 4 so that the port opening is formed in the side surface at the edge of the cell.

Figure 7:
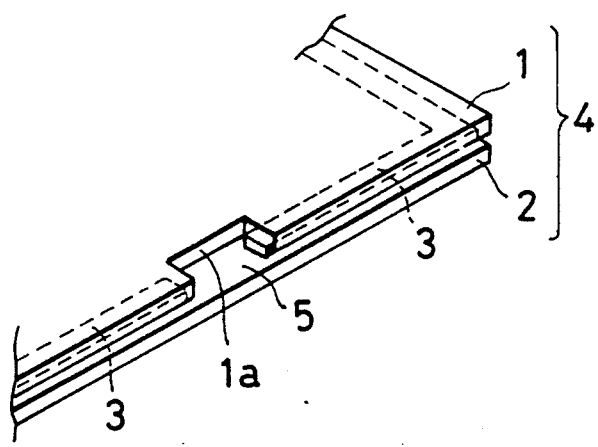
FIG. 7 is a partial perspective view of another embodiment of the liquid crystal injection port formed at an edge of the cell to which the sealing member in accordance with the present invention is applied.

FIG. 7 illustrates another example of the injection port arrangement in accordance with the present invention.

In this example, an opening 5 is formed in a side line of the sealing paste 3 which is arranged in parallel with the edge of each substrate. A cut out 1a is formed in one of the substrates at the position of the opening 5. Due to the cut out 1a, a sufficient amount of clogging paste can be applied to the injection port 5 so that the port 5 can be reliably sealed after injecting the liquid crystal through the port 5.

It is to be noted that the cut out may be formed in the substrate of the arrangement of FIG. 6 at the position of the port 5 between the seal ends 3a and 3b.

The above mentioned injection port (opening) 5 formed at an edge of the cell is sealed by a sealing paste with the use of a sealing member in accordance with the present invention after a liquid crystal is injected in the cell.

FIGS. 8, 9 and 10 illustrate examples of the sealing member of the present invention. The sealing member is made from the same polymer film material as the substrate and has a substantially U-shaped section to hold the cell edge therebetween.

FIG. 8 illustrates sealing member 7 constituted from a back portion 7a having a height corresponding to the sum of the substrates 1 and 2 and the sealing paste 3 (cell gap) and parallel holding pieces (7b and 7c cranked from the both edges of the back portion 7a.

A predetermined amount of the clogging paste 6 (FIG. 11) is filled in the member 7. The member 7 is pushed and applied to the cell edge at the position of the injection port 5 so that the upper and lower pieces 7b and 7c hold the cell.

When the member 7 is pushed by a predetermined length onto the cell edge, the clogging paste 6 within the member 7 evenly covers the port 5 formed in the side surface of the cell edge. By hardening the clogging paste 6, the port 5 formed between the substrates 1 and 2 is covered by the hardened paste 6 and further by the member 7, which reliably seals the port 5 without occurrence of leakage of the liquid crystal through the port 5.

FIG. 9 illustrates another example of the sealing member of the present invention. The sealing member 8 of FIG. 9 is constituted from a back portion 8a having a height corresponding to the sum of the substrates 1 and 2 and the sealing paste 3 (cell gap) and a pair of holding pieces 8b and 8c each extending inward from the edge of the back portion 8a. Due to such a structure, the paste 6 is sufficiently applied to the side surface of the cell edge to seal the opening 5 and the edges of the pieces 8b and 8c resiliently come in contact with the substrates 1 and 2 to tightly hold the cell edge.

In accordance with the structure of the member 8 of FIG. 9, in addition to the advantages of the structure of FIG. 8, it becomes possible to reliably hold the member 8 at the position when the paste 6 is not yet hardened, which facilitates the sealing operation.

FIG. 10 illustrates a still further example of the sealing member of the present invention. The sealing member 9 of FIG. 10 is constituted from a back portion 9a and holding pieces 9b and 9c as the structure of FIG. 9. Each holding piece 9b, 9c has an outwardly opening lip $9b_1$, $9c_1$ formed at an edge thereof so as facilitate the insertion of the member 9 onto the cell edge.

Due to the arrangement of such lips of the holding members 9b and 9c, it becomes possible to easily insert the member 9 onto the cell edge (FIG. 13).

FIGS. 11, 12 and 13 illustrate the states wherein the port 5 formed at the cell edge is sealed by the sealing members 7, 8 and 9, respectively.

Figure 14:
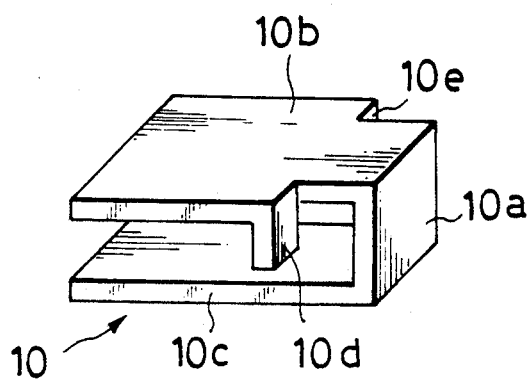
FIG. 14 is a perspective view of a further embodiment of the sealing member of the present invention which has a positioning means for the member.
Figure 15:
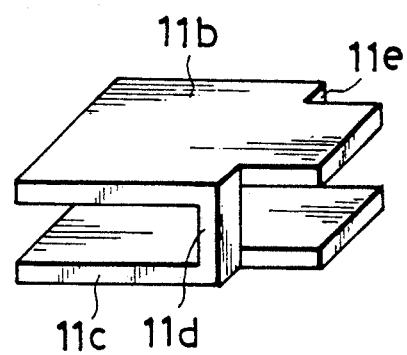
FIG. 15 is a perspective view of a still further embodiment of the sealing member having the positioning means in accordance with the present invention.
Figure 16:
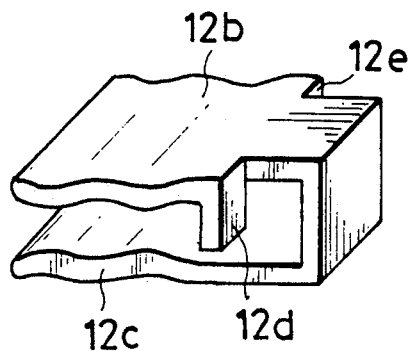
FIG. 16 is a perspective view of a still further embodiment of the sealing member having the positioning means in accordance with the present invention.

FIGS. 14, 15 and 16 illustrate examples of the sealing member having a stop means for limiting the insertion length of the sealing member onto the cell edge.

The sealing member 10 of FIG. 14 is constituted from a back portion 10a and holding pieces 10b and 10c cranked from the both edges of the back portion 10a, respectively. The upper piece 10b is formed wider than the lower piece 10c so that stop tongues 10d and 10e are formed in the neck portion of the piece 10b.

Figure 17:
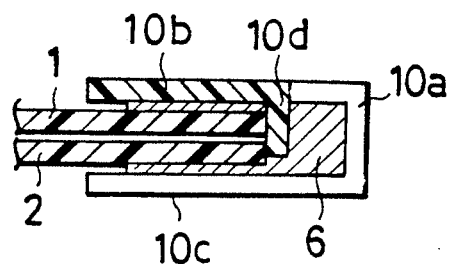
FIG. 17 is a sectional view of the sealing structure of the present invention in which the sealing member of FIG. 14 is applied to the injection port at the cell edge.

FIG. 17 illustrates the state wherein the member 10 of FIG. 14 is applied to the cell edge. The member 10 containing the clogging paste 6 therein is inserted onto the cell edge where the injection port is opening in the side surface of the edge. The insertion depth of the member 10 is limited by the stop tongues 10d and 10e which abut against the ends of the substrates 1 and 2 so that a predetermined amount of paste 6 is held in the neck portion of the member 10 covering the port of the cell. Such an arrangement makes it possible to easily and accurately apply a predetermined amount of paste to the port opening and arrange the member at a predetermined position to avoid positional difference of the member between the products.

FIG. 15 illustrates a still further example of the sealing member of the present invention. The sealing member of FIG. 15 is opened at the portion corresponding to the back portion 10a of the structure of FIG. 14. Instead, the upper and lower holding pieces 11b and 11c are connected by stop shoulders 11d and 11e.

FIG. 16 illustrates a still further example of the sealing member of the present invention. The sealing member of FIG. 16 is different from the structure of FIG. 14 in that the upper and lower holding pieces 12b and 12c are waved so as to tightly and reliably hold the cell edge, which facilitates the sealing operation. Other structure, function and advantages of the sealing member of FIG. 16 are substantially the same as those of FIG. 14.

Figure 18:
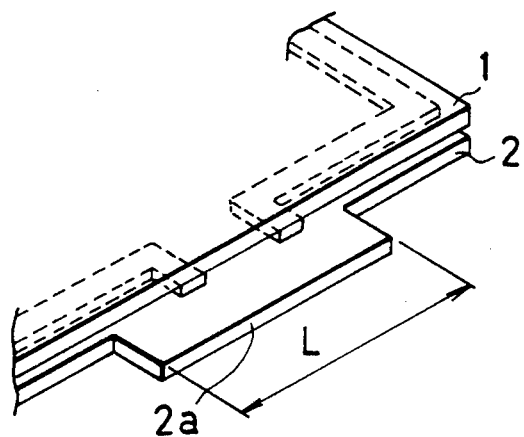
FIG. 18 is a perspective view of an example of the cell edge where the liquid crystal injection port is formed and in which the positioning means is formed in the cell side in accordance with the present invention.

FIG. 18 illustrates a still further example of the sealing structure having the stop means in accordance with the present invention. In the structure of FIG. 18, the lower substrate 2 has a protrusion 2a projecting outward at the position of the injection port opening. The width L of the protrusion 2a is about the same as that of the sealing member applied thereto. Due to this protrusion 2a, the sealing member is stopped at a predetermined position corresponding to the projecting length of the protrusion 2a to limit the insertion length of the member onto the cell edge.

Figure 20:
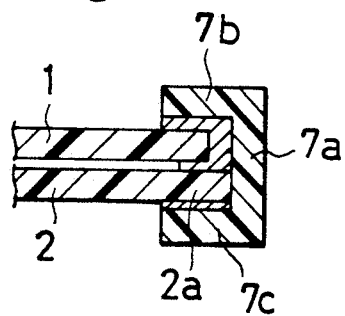
FIG. 20 is a sectional view of the sealing structure of the present invention in which the injection port at the cell edge of FIG. 18 is sealed by a sealing member.

FIG. 20 illustrates the state wherein the sealing member 7 is applied to the cell edge of FIG. 18. The protrusion 2a abuts against the back portion 7a of the sealing member so that the insertion length of the sealing member 7 is limited to remain a space in front of the port opening to hold a predetermined amount of clogging paste therein.

Figure 19:
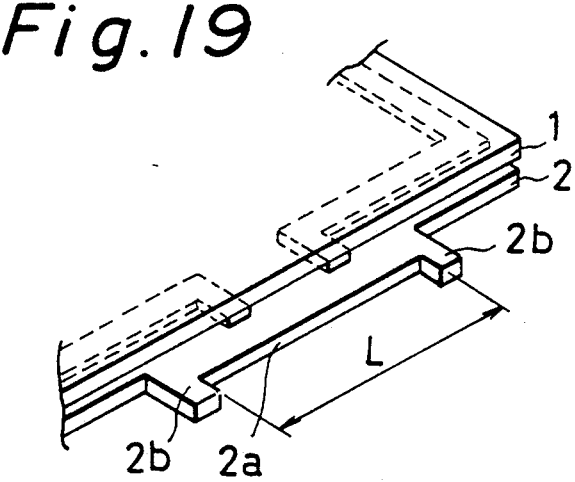
FIG. 19 is a perspective view of another example of the cell edge where the liquid crystal injection port is formed and in which the positioning means is formed in the cell side in accordance with the present invention.

FIG. 19 illustrates a still further example of the sealing structure having the stop means in accordance with the present invention. The structure of FIG. 19 has a protrusion 2a having guide pieces 2b at the both ends thereof. The length L between the guides 2b is slightly wider than the width of the sealing member to be applied thereto. Due to such an arrangement, the sealing member is accurately positioned between the guides 2b, which facilitates the sealing operation and raises the accuracy of the positioning of the sealing member.

Many widely different embodiments of the present invention may be constructed without departing from the spirit and scope of the present invention. It should be understood that the present invention is not limited to the specific embodiments described in the specification, except as defined in the appended claims.

An opening 5 may be disposed on corners of a side edge of a cell 14. In this case, the sealing member 7 with the clogging paste 6 is held on the corners.

What is claimed is:

1. A liquid crystal display element comprising:
   a pair of substrates which face each other for forming a cell gap therebetween;
   a sealing means for bonding said pair of substrates to each other and defining a cell between said substrates, said sealing means having an opening at a side of said cell for forming an injection port for injecting a liquid crystal into said cell, said injection port is to be sealed after said liquid crystal is injected;
   a sealing glue for covering and sealing said injection port; and
   a sealing member attached to said substrates so as to cover said pair of substrates at the position of said injection port while holding said sealing glue therein.

2. A liquid crystal display element according to claim 1, wherein each of said substrates is made from a polymer film.

3. A liquid crystal display element according to claim 1, wherein said sealing means is arranged between said substrates and along the periphery of said substrates and wherein said injection port is formed in a side edge portion of said substrate and defined by two ends of said sealing means at the position of said opening, said two ends being guided to the side edge of said substrate.

4. A liquid crystal display element according to claim 1, wherein one of said substrates has a cut out formed at the position corresponding to said injection port.

5. A liquid crystal display element according to claim 1, wherein said sealing member has a substantially U-shaped section to hold said side edge of said substrates, said U-shape being constituted from a back portion having a height corresponding to the sum of said pair of substrates and said cell gap and two holding pieces extending from said both edges of said back portion.

6. A liquid crystal display element according to claim 5, wherein said holding pieces of said sealing member are perpendicularly cranked from said back portion in parallel to each other.

7. A liquid crystal display element according to claim 5, wherein said holding pieces of said sealing member are inwardly inclined to narrow the opening portion of said U-shape.

8. A liquid crystal display element according to claim 7, wherein each of said holding pieces has a lip portion outwardly opening so as to widen the opening of said U-shape at the end thereof.

9. A liquid crystal display element according to claim 1, wherein said sealing member has a stop means to which the side edge of the substrate abuts for limiting the insertion length of said sealing member onto said cell.

10. A liquid crystal display element according to claim 1, wherein one of said substrates has a protruding portion formed at the position of said injection port, said protruding portion abuts said sealing member so as to limit the insertion length of the sealing member.

11. A liquid crystal display element according to claim 10, wherein said protruding portion has guide pieces formed at both ends thereof for positioning said sealing member applied thereto.

* * * * *